Aug. 19, 1947.  L. S. HAMER  2,425,934
CONSTRUCTION FOR PIPE-LINE FITTINGS
Filed July 19, 1944
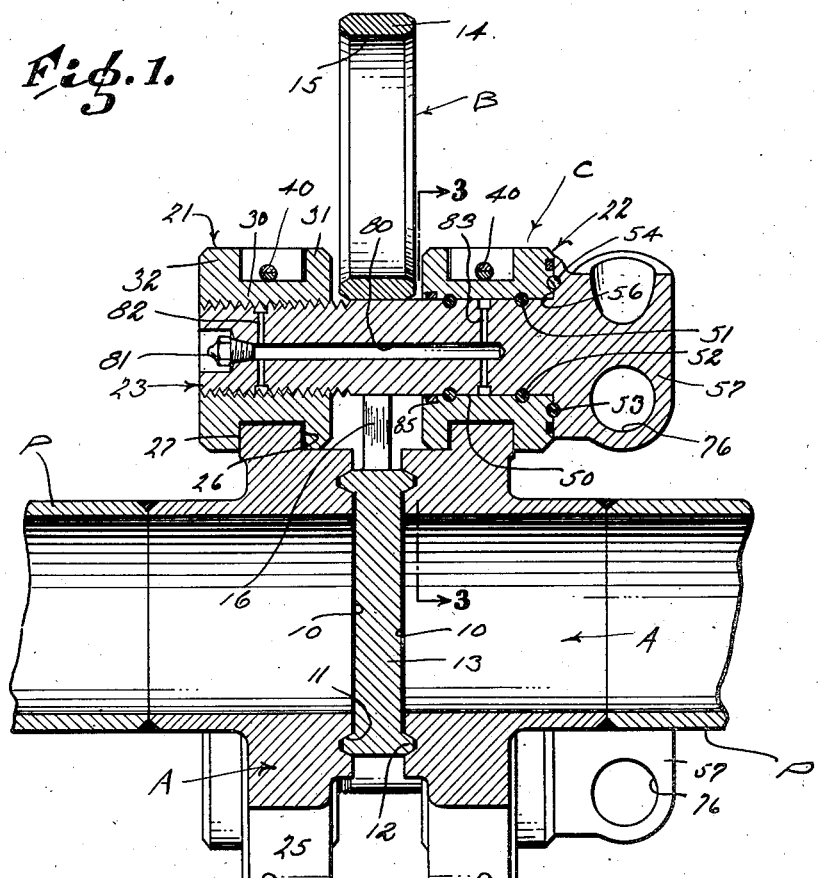
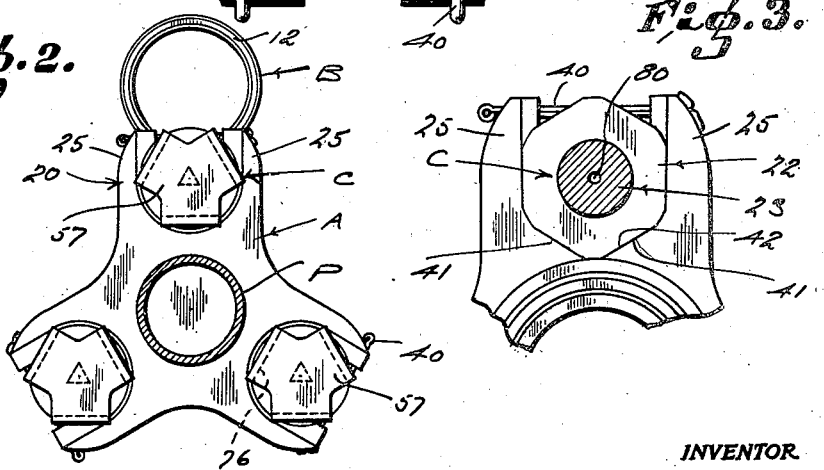
INVENTOR.
Leland S. Hamer
BY
Attorney Patented Aug. 19, 1947

2,425,934

UNITED STATES PATENT OFFICE 2,425,934

CONSTRUCTION FOR PIPE-LINE FITTINGS

Leland S. Hamer, Long Beach, Calif.

Application July 19, 1944, Serial No. 545,604

15 Claims. (Cl. 138—44)

This invention has to do with a construction for pipe line fittings and has particular reference to features of construction applicable to pipe line fittings where there are body parts, or the like, requiring relative movement, it being a general object of the present invention to provide an improved construction for connecting and operating the body sections of a fitting.

There are various devices used in pipe lines, and the like, involving relatively movable or shiftable sections that require that they be connected and operated relative to each other. As an example, devices for handling plates such as orifice plates or line blind plates often involve relatively shiftable body sections requiring that they be joined or tied together and requiring relative shifting or movement.

It is a general object of my present invention to provide an extremely simple and inexpensive and yet highly effective means for joining two parts such as two body sections so that they are tied together and can be operated or shifted relative to each other.

Another object of my invention is to provide a construction for fittings of the character referred to in which the working parts are compact and extremely simple and inexpensive of manufacture.

The various objects and features of my invention will be fully understood from the following detailed description of a typical preferred form and application of the invention, throughout which description reference is made to the accompanying drawings, in which:

Fig. 1 is a longitudinal detailed sectional view of a pipe line fitting embodying the means provided by my invention. Fig. 2 is a reduced end view of the fitting and Fig. 3 is a detailed sectional view taken substantially as indicated by line 3—3 on Fig. 1.

My present invention is applicable to various pipe line fittings where it is required to couple and operate two parts such as two body sections. In the following description I will refer to the invention as being applied to body sections it being understood that the invention is applicable, generally, to situations where two parts or members are to be coupled and to be operated relative to each other. In the particular disclosure made in the drawings I illustrate a fitting of the general type or form which is more fully set forth and claimed in my co-pending application entitled "Pipe fittings," Serial No. 545,605, filed July 19, 1944.

The particular fitting illustrated is designed to be connected between the opposing ends of pipe sections P and it involves two opposed body sections A, a plate section B to be inserted between the body sections and units of the means C provided by this invention which serve to couple and actuate the body sections A. The body sections A of the fitting are shown coupled to the ends of the pipe sections by welding W and they are annular or sleeve-like sections with their inner ends 10 in spaced relation and finished for the reception of the plate section B. In the particular case illustrated the inner end faces 10 of the sections A are formed with annular grooves 11 to receive annular ribs 12 on the plate parts of the section B.

The plate section B involves two distinct plate parts a blind plate 13 and an orifice plate 14. The blind plate is a solid or imperforate plate whereas the orifice plate has a central opening or orifice 15 designed to pass fluid when the orifice plate portion is between the ends of the body sections. In the drawings I show the blind plate 13 between the inner ends of the body sections. The two plate parts of the section B are joined by spaced webs 16 and each plate part has annular ribs 12 projecting from it to engage in the grooves 11 of the sections A.

Each unit of the means C operates to connect and is operable to shift the sections A. In practice there may be various numbers of units of the means C arranged in various manners. However, in a preferred arrangement such as is shown in the drawings there are three such units and they are spaced 120° apart around the axis of the fitting, as clearly shown in Fig. 2. Each unit of the means C or each structure provided by my invention involves, generally, projections 20 on opposite parts of the body sections A, blocks 21 and 22 carried by the projections and a tie member 23 extending between and coupling the blocks and operable to shift the blocks.

The projections 20 extend or project radially from the body sections A and the two projections of the unit or mechanism are located opposite each other or in alignment axially of the fitting. Each projection 20 is an outwardly opening yoke-like structure having spaced parallel arms 25. Each projection has flat finished inner and outer sides 26 and 27, respectively.

The two blocks 21 and 22 are similar in form, each being a spool-like unit having a central turned portion 30, an inner end flange 31 and an outer end flange 32. Each block has a central longitudinal opening for the reception of the tie member 23 and the several parts of each block are concentric. The center portion 30 of each block is designed to fit between the arms 25 of its supporting projection 20 so that the inner flange 31 overlies the inner side 26 of the projection while the outer flange 32 overlies the outer side 27 of the projection. Through this arrangement each spool is supported in its supporting projection against axial movement other than slight movement that occurs due to the provision of mechanical clearance between the parts.

In accordance with the invention means are provided for detachably retaining the blocks in their supporting projections. In the preferred construction I provide a detachable retaining pin 40 to extend between the outer ends of the spaced arms of each projection immediately over the center portion 30 of the supported block. In practice the retaining pins may be in the form of large cotter keys, as I have shown throughout the drawings.

I provide means for holding the blocks against rotation. Various structures may be provided for this purpose. In the case illustrated I provide one or more flat sides 41 on each spool, preferably on the inner flange 31 of each spool, and provide a corresponding shoulder 42 or shoulders 42 on the body section to cooperate with the flat side. The details of this construction are shown in Fig. 3. When a block is retained in its supporting projection 20 by the pin 40 the shoulders 41 and 42 are in cooperative engagement so the block cannot turn.

The tie member 23 is in the form of an elongate bar extending between the two blocks 21 and 22 and into or through the openings in the two blocks. In the particular form of the invention illustrated one end portion of the tie member 23 is externally threaded and cooperates with a thread provided in the bore or opening of the block 21. The other end portion 50 of the tie member is turned so that it is smooth and fits the opening in the block 22 for free rotation of the tie member in the block 22.

In accordance with my present invention I provide a thrust means between the tie member 23 and the block 22. In the particular construction illustrated registering grooves 51 are provided in the bore of the block 22 and the exterior of the part 50 of tie member 23 and balls 52 are arranged in the grooves. Through this construction the tie member and block 22 are coupled so that these two members cannot shift axially relative to each other. I further provide registering grooves 53 in the outer side of the outer flange 32 of block 22 and a shoulder 56 on the member 23, and I provide thrust bearing balls 54 in these registering grooves. In the particular construcion illustrated the shoulder 56 is provided on an enlargement or head 57 provided on the outer or projecting end of the member 23. This projecting head 57 is provided with a plurality of openings 76 designed to receive suitable operating tools to facilitate rotation of the member 23.

By my invention I provide for lubrication of the working parts, that is, for lubrication of the threaded engagement between the member 23 and block 21 and between the member 23 and the block 22. In the preferred construction I provide a longitudinal port 80 in the member 23 open at one end where it is provided with a fitting 81 through which a lubricant can be introduced. Lateral ports 82 extend from port 80 to the exterior of the threaded part of the member 23 so that the threaded connection is lubricated. Lateral ports 83 extend from the port 80 to the exterior of the part 50 of the member 23 so that the lubricant will be distributed between the member 23 and the block 22 to reach the balls 52 and 54. In practice I provide packing rings 85 between the part 50 and the bore of the block 22 and between the shoulder 56 and the outer side of the flange 32 to prevent the escape of lubricant.

When the construction that I have provided is assembled as shown throughout the drawings and when the fitting involves a plate section B such as I have described, the tie member 23 of one of the units of means C extends through the space or opening between the webs 16 of the plate section, tying the plate section to the other parts of the fitting so it cannot be accidentally detached.

With each of the units of the means C assembled as shown in Fig. 1 of the drawings, it will be apparent how rotation of the tie member 23 will result in relative movement between the blocks 21 and 22 and consequent shifting of the body sections A. When the member 23 is rotated it turns freely in the member 22, these two parts being coupled as above described, so that axial movement will not occur between them. As the member 23 rotates the threaded engagement between it and the block 21 causes the block 21 to shift axially. It will be apparent how the thrust means or ball assemblies provided between the member 23 and the block 22 reduce friction and how the lubrication provided keeps the parts in condition to work freely. Whenever it is desired to remove or replace any of the working parts they can be very easily and quickly detached by simply removing the retaining pins 40.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described by invention, I claim:

1. A fitting of the character described including, two body sections shiftable relative to each other, and means for operating the sections including, a block carried by each section, means releasably retaining the block in engagement with the said sections, and a tie member extending between and connecting the sections and being anchored to one block and engaged with the other of the blocks to shift it relative to the first mentioned block when the member is rotated.

2. A fitting of the character described including, two body sections shiftable relative to each other, and means for operating the sections including, a block carried by each section, means holding the blocks against axial movement relative to the sections, and a tie member extending between and connecting the section and engaging both blocks and being threaded to one of the blocks only to shift it axially relative to the other block when the member is rotated.

3. A fitting of the character described including, two body sections shiftable relative to each other, and means for operating the sections including, a block carried by each section, means retaining the blocks in engagement with the sections, and a tie member extending between and connecting the sections and being engaged with one of the blocks to shift it relatively to the other when the member is rotated, the said other block being related to the tie member so the tie member rotates freely relative to it without causing it to shift.

4. A fitting of the character described including, two body sections shiftable relative to each other, and means for operating the sections including, yoke shaped projections opposite each other on the two sections, a block carried between the projections of each section, retainers carried by the projections holding the block between the projections, and a time member extending between and connecting the sections through the blocks and being engaged with one of the blocks to shift it relative to the other when the member is rotated.

5. A fitting of the character described including, two body sections shiftable relative to each other, and means for operating the sections including, projections opposite each other on the two sections, a block carried by each section, means releasably securing the blocks to the projections, and a time member extending between and connecting the sections and being engaged with one of the blocks and bearing on the other block to shift the blocks relative to each other when the member is rotated.

6. A fitting of the character described including, two body sections shiftable relative to each other, and means for operating the sections including projections opposite each other on the two sections, a block carried by each section, a tie member extending between and connecting the sections and anchored to one block and being threaded to the other of the blocks to shift it relative to the first mentioned block when the member is rotated, and means holding said other block against rotation.

7. A fitting of the character described including, two body sections shiftable relative to each other, and means for operating the sections including, yoke shaped projections opposite each other on the two sections, a block carried in each section, retaining pins closing the yoke openings to retain the blocks in the projections, and a tie member extending between and connecting the sections through the blocks and being engaged with one of the blocks to shift it relative to the other when the member is rotated.

8. A fitting of the character described including, two body sections shiftable relative to each other, and means for operating the sections including, projections opposite each other on the two sections, a block carried in each section, and a tie member extending between and connecting the sections through the blocks and being engaged with one of the blocks to shift it relative to the other when the member is rotated, each block having end flanges engaging opposite sides of its supporting projection.

9. A fitting of the character described including, two body sections shiftable relative to each other, and means for operating the sections including, yoke shaped projections opposite each other on the two sections, a block carried in each section, and a tie member extending between and connecting the sections through the blocks and being engaged with one of the blocks to shift it relative to the other when the member is rotated, each block having a center section seated in the yoke of its supporting projection and having end flanges engaging opposite sides of the projection.

10. A fitting of the character described including, two body sections shiftable relative to each other, and means for operating the sections including, projections opposite each other on the two sections, a block carried in each section, a tie member extending between and connecting the sections, the tie member being threaded to one of the blocks, and thrust means between the member and the other block.

11. A fitting of the character described including, two body sections shiftable relative to each other, and means for operating the sections including, projections opposite each other on the two sections, a block carried in each section, a tie member extending between and connecting the sections, the tie member being threaded to one of the blocks, and thrust means between the member and the other block including a shoulder on the tie member engaging one end of the block.

12. A fitting of the character described including, two body sections shiftable relative to each other, and means for operating the sections including, projections opposite each other on the two sections, a block carried in each section, a tie member extending between and connecting the sections, the tie member being threaded to one of the blocks, and thrust means between the member and the other block including registering grooves between the tie member and the block and balls in the grooves.

13. A fitting of the character described including, two body sections shiftable relative to each other longitudinally of the fitting, and means for operating the sections including, projections opposite each other on the two sections, a block carried in each section, a tie member extending longitudinally of the fitting between and connecting the sections, the tie member being threaded to one of the blocks, and thrust means between the member and the other block including a shoulder on the tie member engaging one end of the block, there being a head on the tie member with a part forming the shoulder.

14. A fitting of the character described including, two body sections shiftable relative to each other, and means for operating the sections including, projections opposite each other on the two sections, a block carried in each section, and a tie member extending between and connecting the sections through the blocks and being engaged with one of the blocks to shift it relative to the other when the member is rotated, there being a head on one end of the tie member with radial opening to receive an operating tool.

15. A fitting of the character described including, two body sections shiftable relative to each other, and means for operating the sections including, projections opposite each other on the two sections, a block carried in each section, a tie member extending between and connecting the sections through the blocks and being engaged with one of the blocks to shift it relative to the other when the member is rotated, and means adapted to supply a lubricant between the tie member and blocks.

LELAND S. HAMER.

REFERENCES CITED

The following references are of record in the file of this patent:

UNITED STATES PATENTS

| Number | Name | Date |
|---|---|---|
| 1,631,264 | Haldeman | June 7, 1927 |
| 2,214,959 | Hamer | Sept. 17, 1940 |
| 2,271,138 | Hamer | Jan. 27, 1942 |
| 213,142 | Strater et al. | Mar. 11, 1879 |
| 639,198 | McDonald | Dec. 12, 1899 |
| 2,039,912 | Leighton | May 5, 1936 |
| 2,309,304 | Creighton | Jan. 26, 1943 |